United States Patent
Marwaha

(10) Patent No.: US 7,139,938 B2
(45) Date of Patent: Nov. 21, 2006

(54) SYSTEM AND METHOD FOR PROVIDING COMMON EVENT FORMAT USING ALERT INDEX

(75) Inventor: Navjot Marwaha, Richmond, VA (US)

(73) Assignee: Capital One Financial Corporation, McLean, VA (US)

(*) Notice: Subject to any disclaimer, the term of this patent is extended or adjusted under 35 U.S.C. 154(b) by 353 days.

(21) Appl. No.: 10/136,652

(22) Filed: Apr. 30, 2002

(65) Prior Publication Data

US 2003/0200486 A1 Oct. 23, 2003

Related U.S. Application Data

(60) Provisional application No. 60/369,017, filed on Apr. 1, 2002.

(51) Int. Cl.
*G06F 11/00* (2006.01)

(52) U.S. Cl. ............................................. 714/48; 714/57

(58) Field of Classification Search .................. 714/25, 714/46, 48, 57, 26
See application file for complete search history.

(56) References Cited

U.S. PATENT DOCUMENTS

| | | | |
|---|---|---|---|
| 6,006,016 A * | 12/1999 | Faigon et al. .................. 714/48 |
| 6,118,936 A * | 9/2000 | Lauer et al. .................. 709/224 |
| 6,263,455 B1 * | 7/2001 | Bannister ..................... 714/25 |
| 6,401,217 B1 * | 6/2002 | Clark et al. .................... 714/20 |
| 6,425,006 B1 * | 7/2002 | Chari et al. .................. 709/224 |
| 6,658,465 B1 * | 12/2003 | Touboul ...................... 709/223 |
| 6,671,818 B1 * | 12/2003 | Mikurak ........................ 714/4 |
| 6,704,874 B1 * | 3/2004 | Porras et al. ................ 713/201 |
| 2002/0083168 A1 | 6/2002 | Sweeney et al. |
| 2002/0107958 A1 | 8/2002 | Faraldo, II |
| 2003/0110249 A1 | 6/2003 | Buus et al. |
| 2005/0081156 A1 * | 4/2005 | Clark et al. .................. 715/736 |

OTHER PUBLICATIONS

PATROL® Enterprise Manager Automation Reference Manual, Version 4.2, Jun. 5, 2000, http://www.bmc.com/supportu/hou_Support_ProdVersion/0,3648,19097_0_28396_0,00.html.*
PATROL® Enterprise Manager Customization Guide, Version 4.2, Jun. 5, 2000, http://www.bmc.com/supportu/hou_Support_ProdVersion/0,3648,19097_0_28396_0,00.html.*
PATROL® Enterprise Manager Features, Functions, and Technology Overview, 2001, http://documents.bmc.com/products/documents/19/92/11992/11992.pdf.*
PATROL® Enterprise Manager Features, Functions, and Technology Overview, 2001, http://documents.bmc.com/products/documents/19/92/11992/11992.pdf, pp. 7-8.*
Interlink Software, "Interlink Software iView", Jun. 2001.

* cited by examiner

*Primary Examiner*—Scott Baderman
*Assistant Examiner*—Paul Contino
(74) *Attorney, Agent, or Firm*—Baker & McKenzie LLP

(57) ABSTRACT

A common event format associated with unique index value is provided to allow a common structure to rules, regardless of from which system the message is originating. Messages coming from different sources into an enterprise manager are tokenized to contain essential information, and standardized into a common event format. Each token is then assigned an index, referred to as an alert index. This index may be a unique identifier that corresponds to a set of alerts having common token values or attributes, or a unique index for a particular alert. This alert index is then used to facilitate the identification and handling of the various events generated by various sources.

18 Claims, 10 Drawing Sheets

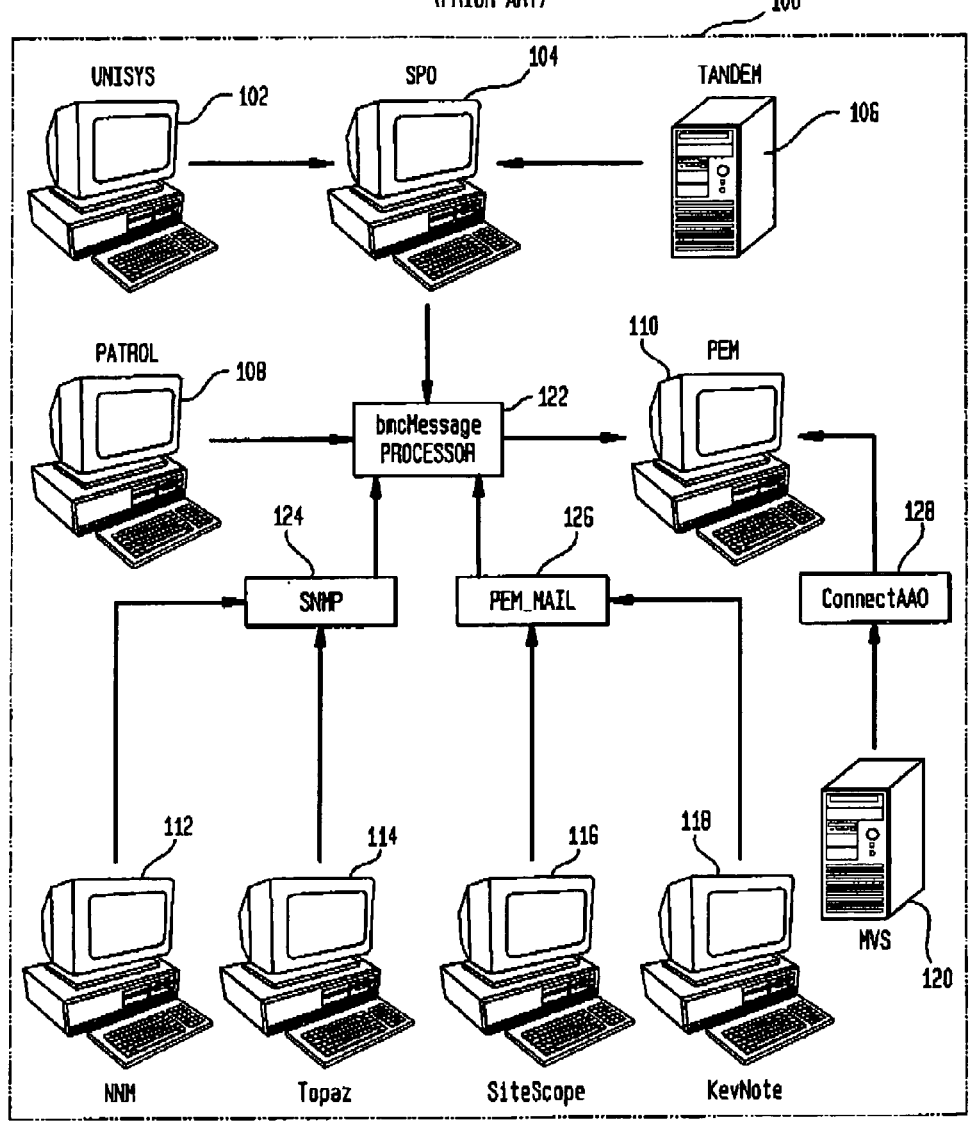

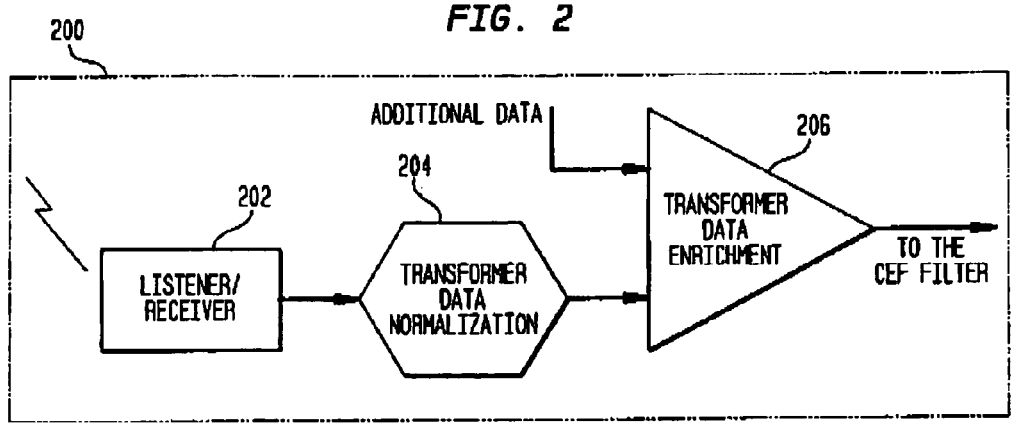
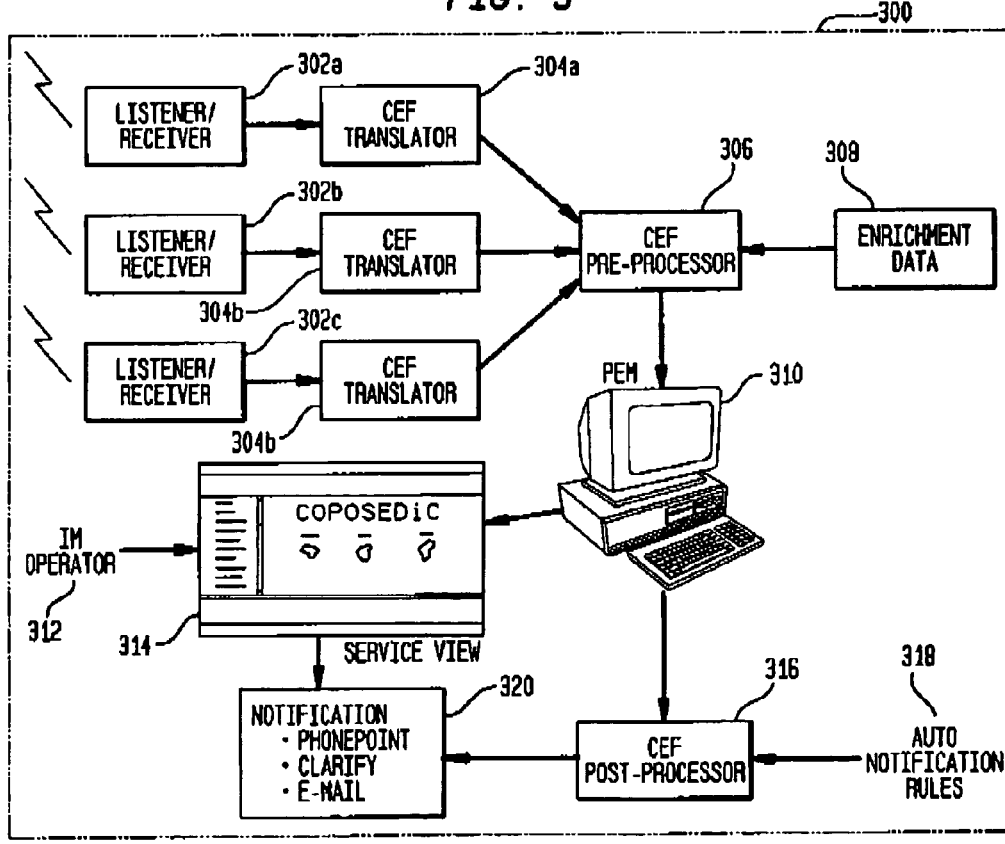

ACTION TABLE

*FIG. 7* ← 700

| AlertIndex | Path | OriginClass | Origin | Domain | ObjectClass | Object | Parameter | IsActive |
|---|---|---|---|---|---|---|---|---|
| 0101800003 | Patrol | PATROL3.3 | persian | persian | * | * | FSCapacity | ☑ |
| 0101800002 | Patrol | PATROL3.3 | persian | persian | * | * | DSKPercentBusy | ☑ |
| 0101800001 | Patrol | PATROL3.3 | persian | persian | * | * | CPUUserTime | ☑ |
| 0101800000 | Patrol | PATROL3.3 | persian | persian | * | * | CPUSysTime | ☑ |
| 0103900702 | Patrol | PATROL3.3 | norton | norton | AMQ_QXMIT* | * | * | ☑ |
| 0103900601 | Patrol | PATROL3.3 | norton | norton | AMQ_QManager* | * | ChEventsOutstan | ☐ |
| 0103900603 | Patrol | PATROL3.3 | norton | norton | AMQ_QManager* | * | * | ☑ |
| 0103900705 | Patrol | PATROL3.3 | norton | norton | AMQ_QLOCAL* | 'SYSTEMI' | * | ☐ |
| 0103900703 | Patrol | PATROL3.3 | norton | norton | AMQ_QLOCAL* | 'MCM' | * | ☐ |
| 0103900704 | Patrol | PATROL3.3 | norton | norton | AMQ_QLOCAL* | 'BMCI' | * | ☐ |
| 0103900706 | Patrol | PATROL3.3 | norton | norton | AMQ_QLOCAL* | 'AMQI' | * | ☐ |
| 0103900701 | Patrol | PATROL3.3 | norton | norton | AMQ_QLOCAL* | * | * | ☑ |
| 0103900700 | Patrol | PATROL3.3 | norton | norton | AMQ_QDEAD* | * | * | ☑ |
| 0103900600 | Patrol | PATROL3.3 | norton | norton | AMQ_Channel* | * | ChEventsOutstan | ☐ |
| 0103900602 | Patrol | PATROL3.3 | norton | norton | AMQ_Channel* | * | * | ☑ |
| 0103900500 | Patrol | PATROL3.3 | norton | norton | *JRUN* | * | * | ☑ |
| 0103900008 | Patrol | PATROL3.3 | norton | norton | * | * | SWPTotSwapUse | ☑ |
| 0103900007 | Patrol | PATROL3.3 | norton | norton | * | * | PROCPPCPUPers | ☑ |
| 0103900006 | Patrol | PATROL3.3 | norton | norton | * | * | MEMPageScanned | ☑ |
| 0103900005 | Patrol | PATROL3.3 | norton | norton | * | * | MEMFreeMem | ☑ |
| 0103900004 | Patrol | PATROL3.3 | norton | norton | * | * | KERProcUsedPer | ☑ |
| 0103900003 | Patrol | PATROL3.3 | norton | norton | * | * | FSCapacity | ☑ |
| 0103900002 | Patrol | PATROL3.3 | norton | norton | * | * | DSKPercentBusy | ☑ |
| 0103900001 | Patrol | PATROL3.3 | norton | norton | * | * | CPUUserTime | ☑ |
| 0103900000 | Patrol | PATROL3.3 | norton | norton | * | * | CPUSysTime | ☑ |
| 0100000000 | Patrol | PATROL3.3 | localhost | * | Host | * | PatrolConnection | ☐ |
| 0104400300 | Patrol | PATROL3.3 | kronos | kronos | CAPONE_TEMP_ | * | * | ☑ |
| 0104400702 | Patrol | PATROL3.3 | kronos | kronos | AMQ_QXMIT* | * | * | ☐ |
| 0104400601 | Patrol | PATROL3.3 | kronos | kronos | AMQ_QManager* | * | ChEventsOutstan | ☐ |
| 0104400603 | Patrol | PATROL3.3 | kronos | kronos | AMQ_QManager* | * | * | ☐ |
| 0104400705 | Patrol | PATROL3.3 | kronos | kronos | AMQ_QLOCAL* | 'SYSTEMI' | * | ☐ |
| 0104400703 | Patrol | PATROL3.3 | kronos | kronos | AMQ_QLOCAL* | 'MCM' | * | ☑ |
| 0104400704 | Patrol | PATROL3.3 | kronos | kronos | AMQ_QLOCAL* | 'BMCI' | * | ☑ |
| 0104400706 | Patrol | PATROL3.3 | kronos | kronos | AMQ_QLOCAL* | 'AMQI' | * | ☐ |
| 0104400701 | Patrol | PATROL3.3 | kronos | kronos | AMQ_QLOCAL* | * | * | ☑ |
| 0104400700 | Patrol | PATROL3.3 | kronos | kronos | AMQ_QDEAD* | * | * | ☑ |
| 0104400600 | Patrol | PATROL3.3 | kronos | kronos | AMQ_QChannel* | * | ChEventsOutstan | ☐ |
| 0104400602 | Patrol | PATROL3.3 | kronos | kronos | AMQ_QChannel* | * | * | ☑ |
| 0104400200 | Patrol | PATROL3.3 | kronos | kronos | ACAPS_DECISIO | ACAPS_D | * | ☑ |
| 0104400201 | Patrol | PATROL3.3 | kronos | kronos | * | * | RRB_ACCTREQ | ☑ |
| 0104400001 | Patrol | PATROL3.3 | kronos | kronos | * | * | PROCPPCount | ☑ |
| 0104400000 | Patrol | PATROL3.3 | kronos | kronos | * | * | FSCapacity | ☑ |
| 0104100702 | Patrol | PATROL3.3 | kronk | kronk | AMQ_QXMIT* | * | * | ☑ |
| 0104100601 | Patrol | PATROL3.3 | kronk | kronk | AMQ_QManager* | * | ChEventsOutstan | ☐ |
| 0104100603 | Patrol | PATROL3.3 | kronk | kronk | AMQ_QManager* | * | * | ☑ |
| 0104100705 | Patrol | PATROL3.3 | kronk | kronk | AMQ_QLOCAL* | *SYSTEMI* | * | ☐ |
| 0104100703 | Patrol | PATROL3.3 | kronk | kronk | AMQ_QLOCAL* | *MCMI* | * | ☐ |

[Submit] [Export URM]

CEF ALERT INDEX TABLE

EDITING PERSON DOCUMENT ON ATHENA

FIG. 9

EDITING GROUP DOCUMENT ON ATHENA

SYSTEM AND METHOD FOR PROVIDING COMMON EVENT FORMAT USING ALERT INDEX

CROSS REFERENCE TO RELATED APPLICATIONS

This application claims the benefit of U.S. Provisional Patent Application No. 60/369,017 filed on Apr. 1, 2002.

TECHNICAL FIELD OF THE INVENTION

The present application relates to computer system alerts and, more particularly, to a system and method for providing and processing events and alerts using alert indices for alerts generated in various computer systems.

BACKGROUND OF THE INVENTION

Enterprise management generally refers to managing computing environment in an enterprise that includes a variety of computer platforms and applications. An enterprise management programs referred to herein as enterprise managers, typically include a number of software tools to perform functions such as monitoring databases, scheduling jobs, configuring various data in the enterprise, to manage the overall functions of the computing environment in an enterprise. In doing so, enterprise managers invariably consolidate and process messages and events that are communicated among the platforms, applications, and various tools running on the platforms.

One common problem that users and developers encounter while using enterprise management tools to consolidate enterprise messages is that the messages from different sources such as MVS, UNIX, Tandem, have different message syntax. Thus, while building rules in alert logic filter engines ("ALFE"), users and developers frequently fall into a trap of defining token names that are specific to the originating system.

These different naming conventions for similar types of tokens may raise many inherent problems when processing them. The different naming conventions from different sources also require high maintenance, especially with increasing amount of alerts coming into an enterprise manager.

Further, various alert messages from different systems having different formats make gathering of information and notifying appropriate parties difficult and extremely cumbersome. Different sources shown in FIG. 1 are illustrative of such an example where the different sources communicate messages in different format using their respective names.

FIG. 1 illustrates various systems 102, 104, 106, 108, 110, 112, 114, 116, 118, 120 that communicate their alert messages to an enterprise manager, all in different formats. For example, event messages generated by one known event manager, connectPATROL conforms to the following format:

BMCEMFV210 | <OriginClass>=<Origin> <OriginKey> | <OriginDateTime> | <OriginEventClass> <OriginSeverity> <EventType> | <DomainClass>=<Domain> | <ObjectClass>=<Object> | <ParameterName>=<ParameterValue> | <ITMgmtLayer>_<ITMmgtProcess> | <ITMgmtState> | <EventText> |~<\n> where,

| | |
|---|---|
| BMCEMFV210 | Is CEF version |
| <OriginClass> | Is PATROL 3.3 |
| <Origin> | Is the PATROL agent host name |
| <OriginKey> | Is the PATROL event ID |
| <OriginDateTime> | Is the PATROL event time |
| <OriginEventClass> | Is the PATROL event catalog and class as <catalog>:<class> |
| <OriginSeverity> | Is the severity of the event as set by the PATROL agent |

| | |
|---|---|
| `<EventType>` | Is one of the following:<br>INFORMATIOM<br>WARNING<br>ALARM<br>ERROR<br>CLOSE<br>CANCEL<br>RESPONSE<br>STATE_CHANGE<br>optionally followed by ACKNOWLEDGED or ESCALATED |
| `<DomainClass>` | Is the machine type as discovered by PATROL |
| `<Domain>` | Is the host name |
| `<ObjectClass>` | Is the Knowledge Module application name |
| `<Object>` | Is the Knowledge Module application instance |
| `<ParameterName>` | Is the Knowledge Module application parameter name |
| `<ParameterValue>` | Is the Knowledge Module application parameter value |
| `<ITMgmtLayer>` | Is one of the following:<br>APPLICATOIN<br>SYSTEM<br>NETWORK<br>MIDDLEWARE<br>DATABASE<br>STORAGE<br>OUTPUT<br>UNKNOWN<br>COMMAND/POST connect PATROL always sets as UNKNOWN. |

| | |
|---|---|
| <ITMgmtProcess> | Is one of the following:<br>AVAILABILITY<br>CONFIGURATION<br>CAPACITY<br>SECURITY<br>RECOVER<br>UNKNOWN<br>COMMAND/POST connect PATROL always sets as UNKNOWN. |
| <ITMgmtState> | Is the normalized state as defined for the ITMgmtProcess. COMMAND/POST connect PATROL always sets as UNDEFINED. |
| <EventText> | Is the PATROL event description. |

For example, the following message,

BMCEMF210 | PATROL3.3=apollo 5162 | 07/24/2001 15:46:48 | 0:UpdParState 2 CANCEL | SOLARIS=apollo | RRG_ACCTREQ=RRG_ACCTREQ | NumReceived=N/A | UNKNOWN_UNKNOWN | UNDEFINED | State Change: OK VOID Update status of parameter NumReceived: new value 1.000000 |~ is parsed by a bmcMessageProcessor 122 transformer as:

parse var nextLine CEFversion" | "patrolVersion"="objectName index" |" . "| "eventClass severity eventType" | "objectOS"="fullobjectName" | "application"="instance" | "parameter"="value" | "ITmgmtCatagory" | "ITmgmtState" |" message "|{End}" .

instance = application||"."||instance

The transformer passes the following message to bmcMessageProcessor 122 filter as:

newLine = "{BMP.1.0}" msgType "|" objectType "|" objectName "|" objectId "|" objectLocation "|" objectParent "|" parameter "|" instance "|" value "|" index "|" message "{EOM}" LF As another example, event messages generated by another known event manager, connectAAO 128, are in one of the following four format:

[~ADD~]^v<queue>^v<key>^v<alertToken>^v<source>^v<origin>^v<gmenode>^v<level>^v<message>^v<dateCreated>^v<timeCreated>^v[~ENDM~]
[~CLEAR~]^v<gmenode>^v[~ENDM~]
[~CONNECT~]^v<gmenode>^v<message>^v[~ENDM~]
[~DISCON~]^v<gmenode>^v<message>^v[~ENDM~]

where

| | |
|---|---|
| <queue> | Is the queue specified in the AO rule |
| <key> | Is the word or words that uniquely identfiy the alert message |
| <alertToken> | Is the unique alert number on the AO side. This is used to synchronize Patrol Enterprise Manager ("PEM") with AO |
| <source> | Is the system ID (eg: MVS5, MVSD) |
| <origin> | Is the source task (eg: BBISS, CSM) |
| <gmenode> | Is the system ID (eg: MVS5, MVSD) |

| | |
|---|---|
| <level> | Is the severity level defined on AO. It can be one of the following:<br>1 (Critical)<br>2 (Major)<br>3 (Minor)<br>4 (Warning)<br>5 (Informational)<br>6 (Clear) |
| <message> | Is the alphanumeric alert message |
| <dateCreated> | Is the AO alert date |
| <timeCreated> | Is the AO alert time |

An example of ConnectAAO message includes:
[~ADD~]^vCPUD^vCSMMVSDDBTDMSTR^v832994648^vMVSD^vMVSD^vMVSD^v2^vA CM780A DBTDMSTR has come up, but the CSM database indicates it should be down^v2001-07-31^v15:01:38^v[~ENDM~]

Yet in another example, mail generated by SiteScope 116 is in the following format:

Mail Subject: SiteScope (<Host>)
Mail Body:<alertState>
NAME=<name>
GROUP=<group>
STATE=<state>

Where

| | |
|---|---|
| <Host> | Is the SiteScope host (eg: SCMon, SOMon or SFMon) |
| <alertState> | Is one of the following:<br>HB<br>ER<br>OK |

| | |
|---|---|
| \<name\> | Is the monitor within SiteScope group. |
| \<group\> | Is the monitoring group or sub-group within the SiteScope instance. |
| \<state\> | Is the problem determined through SiteScope monitor. |

An example of a SiteScope message includes:

Mail Subject: SiteScope (199.244.218.26)
Mail Body: ER
NAME= Trans:InvestorCntr (11/21)
GROUP= www info Trans
STATE= server error on step 4, http://www.corporate-ir.net/ireye/ir_site.zhtml?ticker=COF&script=200

A mail processor such as the processMail parses the above SiteScope message as:

```
instance = mailfrom
parse var mailsubject . "("objectName")"
alarmState = mailLine.1
parse var mailLine.2 "NAME="parameter
parse var mailLine.3 "GROUP="application
parse var mailLine.4 "STATE="value
```

The mail processor 126 then may send over the message to an enterprise manager such as the Patrol Enterprise Manager ("PEM") as:

{Start}PEM_MAIL FROM: "||mailfrom||" SUBJECT: "||mailsubject||" MESSAGE: HOST: "||objectName||" STATUS: "||alarmState||" GROUP: "||application||" NAME: "||parameter||" STATE:

"||value||"{End}"||LF

A message processor such as the bmcMessageProcessor transformer parses the message as:

. "FROM: "mailfrom" SUBJECT: "mailsubject" MESSAGE: "message"{End}"

and from within the message:

"HOST: "objectName" STATUS:" . "GROUP: "instance" NAME: "parameter" STATE: "value"{End}"

and passes the following message to bmcMessageProcessor filter:

newLine = "{BMP.1.0}" msgType "|" objectType "|" objectName "|" objectId "|" objectLocation "|" objectParent "|" parameter "|" instance "|" value "|" index "|" message "{EOM}" LF As another example, mail generated by Keynote 118 is in the following format:

Mail Subject: Keynote <parameter>
Mail Body:
<Date Time>
<application>
<valueType> <value>

Where
<Date Time>      Is the Keynote alert date/time
<application>    Is the URL or application in issue.

<parameter>         Is the type of the alert (eg: Performance
                   Alert or Error Alert)
<valueType>       Is the type of value the monitor is
                   measuring (eg: Aggregate)
<value>            Is the numeric value of the measured
                   parameter.

An example of a Keynote message includes:

Mail Subject: Keynote Performance Alert
Mail Body:
08/01/2001 05:08 GMT
http://www.capitalone.com/parent/indexn.shtml
Performance Alert:
Aggregate            9.360 secs A mail parser such as the processMail parses the message as:

objectName = "Keynote"
application = mailLine.2
parameter = mailLine.3
parse var mailLine.4 valueType value and sends over the message to PEM 110 as:

{Start}PEM_MAIL FROM: "||mailfrom||" SUBJECT: "||mailsubject||" MESSAGE: APPL: "||application||" PARM: "||parameter||" VALUE: "||value||"{End}"||LF bmcMessageProcessor transformer parses the message as:

. "FROM: "mailfrom" SUBJECT: "mailsubject" MESSAGE: "message"{End}"

and from within the message:

"APPL: "instance" PARM: "parameter" VALUE: "value"{End}"

and passes the following message to bmcMessageProcessor filter:

newLine = "{BMP.1.0}" msgType "|" objectType "|" objectName "|" objectId "|" objectLocation "|" objectParent "|" parameter "|" instance "|" value "|" index "|" message "{EOM}" LF As yet another example, Network Node Manager ("NNM") 112 sends PEM alerts through SNMP 124, which are parsed by bmcMessageProcessor transformer in the following order:

```
parse var nextLine . "|" . "|" . "|" . "| "source" |" . "|" . "| "objectName" | "status" | "severity message "| {End}" .
message = strip(message)
do while pos("|",message) > 0
    parse var message s1"|"s2
    message = strip(s1)||" "||strip(s2)
end
```

The message field is further parsed for NNM alerts in the following order:

parse var message objectname .

and then passed to bmcMessageProcessor filter as:

newLine = "{BMP.1.0}" msgType "|" objectType "|" objectName "|" objectId "|" objectLocation "|" objectParent "|" parameter "|" instance "|" value "|" index "|" message "{EOM}" LF In this instance, the only tokens being used here are objectName and message.

In another example, Topaz 114 sends PEM alerts through SNMP 124, which are parsed by bmcMessageProcessor transformer in the following order:

```
parse var nextLine . "|" . "|" . "|" . "| "source" |" . "|" . "|
"objectName" | "status" | "severity message "| {End}" .
message = strip(message)
do while pos("|",message) > 0
     parse var message s1"|"s2
     message = strip(s1)||" "||strip(s2)
end
```

The Topaz message is in the following format:

alertName <objectType> alarmID <alarmID> alertSeverity <severity> alertTriggerCause <message> alertActualDescription <parameter> alertUserMessage <objectName> transEventIndex <eventIndex> transactionName <tName> organization <instance> host <host> location <location> script <script> eventTime <eventTime> eventActualDecription <eventDecription>

An example of a Topaz message may include:

alertName  Indexn Homepage failed  alarmID 203 alertSeverity high(2) alertTriggerCause  Failed Transaction(s) alertActualDescription  Transaction failed. alertUserMessage  WWW transEventIndex Wrong Type (should be Gauge): 1 transactionName Indexn organization  WWW host  kdctpz03 location  INTERNET script Indexn eventTime  Tuesday, July 31, 2001 04:13:56 PM eventActualDescription Transaction failed.

The message field is further parsed for Topaz alerts in the following order:

parse var message . "alertName" objectType " alarmID " . "alertTriggerCause" message " alertActualDescription " parameter " alertUserMessage " objectName " transEventIndex" . "organization " instance .

objectParent = "Topaz"

and then passed to bmcMessageProcessor filter as:

newLine = "{BMP.1.0}" msgType "|" objectType "|" objectName "|" objectId "|" objectLocation "|" objectParent "|" parameter "|" instance "|" value "|" index "|" message "{EOM}" LF In another example, SPO 104 sends messages to PEM in the following format:

{Start}{Start}{HostId} <objectName> {Alarmid} <index> {helpText} <parameter> {msgText} <message> {End}

Where
<objectName>    Is the source of the alert (eg: Tandem, PROD, DEV, CANADA)
<index>         Is the SPO alert ID
<msgText>       Is the alert message as seen on SPO An example of an SPO message includes:

{Start}{Start}{Hostid} PROD {Alarmid} 3-0 {helpText}    {msgText}

THIS IS A HEART BEAT FROM SPO-PR
OD...THump....THump {End} bmcMessageProcessor transformer parses the message as:

parse var nextline . "{Hostid}" objectName .  "{Alarmid}" index "{helpText}" parameter "{msgText}" message"{End}" .

Depending on the alert message itself, the message is further parsed for other token values.  It then passes on the message to the bmcMessageProcessor filter as:

newLine = "{BMP.1.0}" msgType "|" objectType "|" objectName "|" objectId "|" objectLocation "|" objectParent "|" parameter "|" instance "|" value "|" index "|" message "{EOM}" LF In this instance, the only tokens being used here are objectName and message.

In another example, Topaz 114 sends PEM alerts through SNMP 124, which are parsed by bmcMessageProcessor transformer in the following order:

As illustrated in the above examples, the formats of various messages shown above, as well as other message alerts such as ESQ and ITO, received in PEM, an enterprise manager have entirely different formats. In addition, as described above, each intermediary process may parse the messages differently. With increasing number of actionable alerts coming in, it becomes more and more difficult for the operators to manage, process, and handle alerts. Further, it becomes extremely difficult to automate and coordinate the alert handling and alert reporting processes.

SUMMARY OF THE INVENTION

To overcome this problem, a common event format ("CEF") designed to allow a common structure to rules, regardless of from which system or application the message is originating, has been implemented. Common event format includes a set of tokens, which contain essential information coming from different sources into an enterprise manager. For example, token "domainClass" may include the type of domain the alert is associated with, such as MVS and Solaris, while token "domain" may include the specific source of the alert such as MVSD and Apollo. Each token is then assigned an index, referred to as an alert index. This index may be a unique identifier that corresponds to a set of alerts having common token values or attributes or a unique index for a particular alert.

In another aspect, the indices assigned are used to coordinate alert reporting functionalities such as service views and notifications, both automatic and manual. In one aspect, indices may, for example, be assigned based on a business group originating the alerts regardless of the originating platforms. In this way, alerts may be grouped according to businesses that generate the alerts, facilitating event handling and reporting functionalities considerably.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 1 illustrates various systems that communicate their alert messages to an enterprise manager, all in different formats;

FIG. 2 is a diagram illustrating an overview of different phases involved in providing a common event format;

FIG. 3 is a flow diagram illustrating the flow of events in one embodiment;

FIG. 7 illustrates an example of an alert index table;

FIGS. 8 and 9 illustrate directory information screen shots;

DETAILED DESCRIPTION OF THE INVENTION

Figure 4:
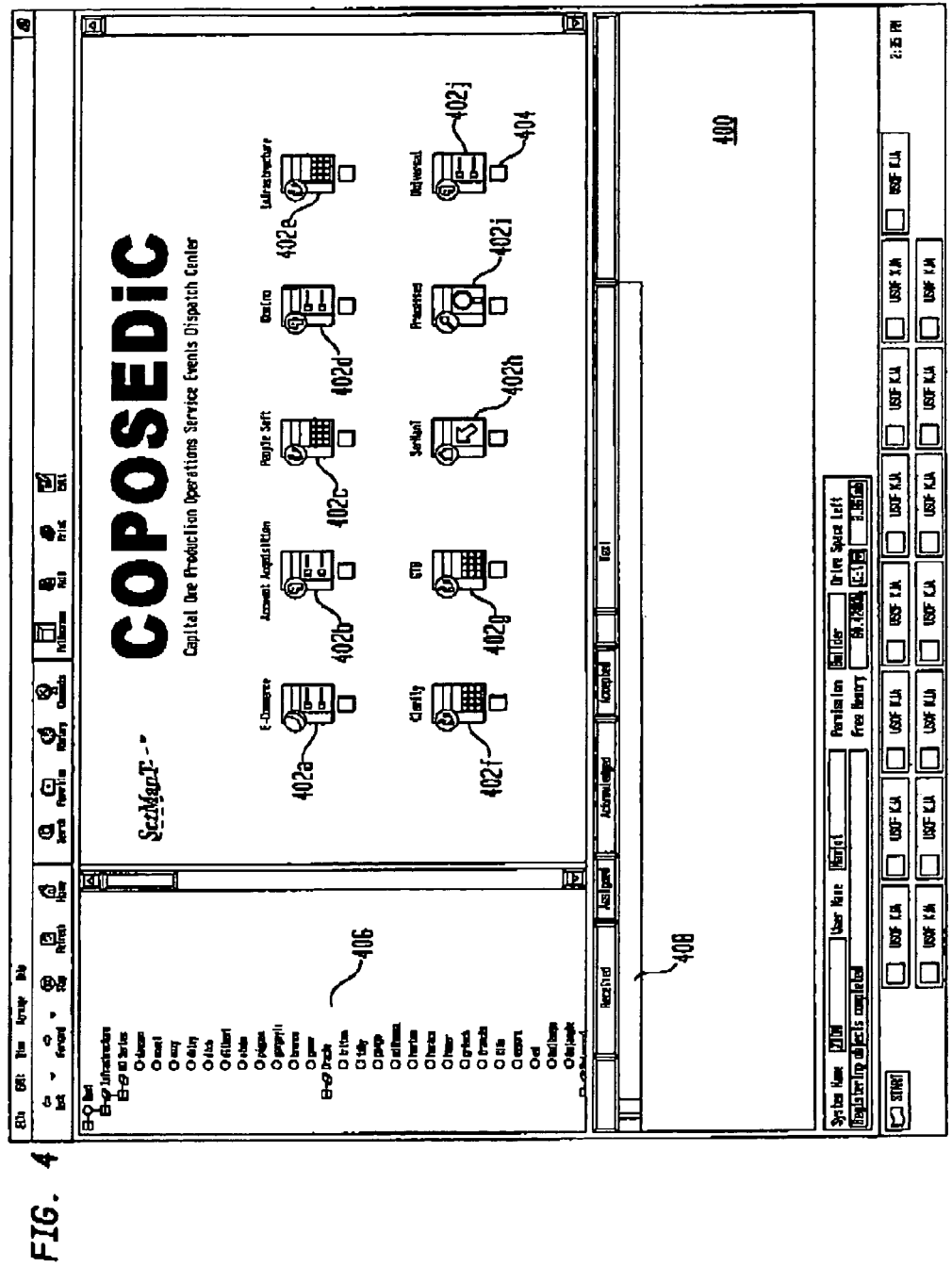
FIG. 4 shows and example of a service view web page.

FIG. 2 is a diagram illustrating an overview of different phases involved in providing a common event format. At 202, a listener or receiver listens for incoming alerts. In data normalization phase, alert messages are translated into a common message string. Normalization may be done by the enterprise manager server before the alert string reaches the enterprise manager, for example, through a data normalization transformer 204. The data normalization transformer 204 typically gathers information such as the source, type, and status of a problem associated with an alert message. In data enrichment phase, a transformer 206, for example, additional data associated with the alert message. These additional data added during the data enrichment phase will be describe in more detail hereinbelow.

FIG. 3 is a flow diagram illustrating the flow of events in one embodiment. As briefly described with reference to FIG. 2, in message normalizing phase, the tokens such as OriginDateTime, OriginClass, OriginKey, OriginSeverity, Domain, ObjectClass, Object, Parameter, ParameterValue, and FreeText, for example, may be extracted from an incoming alert.

The following tables show examples of the tokens and their values that may be updated or assigned values during the normalization phase in one embodiment. It should be understood that the following tokens are described as examples only. For example, not all of the following tokens may be defined during this phase, or additional tokens may be defined during this phase.

| OriginDateTime | |
|---|---|
| Description | The date/time that the event occurred at the origin. |
| Purpose | Used in understanding the time at which the event occurred according to the local environment. |
| Format | In the same format as it comes in |
| Remarks | If the original date/time is present, then that may be used, otherwise the connecting agent (SPO, ESQ etc.) may add a date |
| Example | 20010315 14:34:05 |
| OriginClass | |
| Description | The class of mid level manager that produces the alert |
| Purpose | Primarily used as selection criteria. |
| Format | One word |
| Remarks | This may be a part of the enrichment process |
| Example | NNM; SPO; PATROL; AO |
| OriginKey | |
| Description | A unique identification of the event or alert within the origin |
| Purpose | Event synchronization with the mid level manager. |
| Format | One word |
| Remarks | |
| Example | 1234567; ENUM87394 |
| OriginSeverity | |
| Description | The severity of the event as reported at the source |
| Purpose | To determine the severity of the PEM alert |

-continued

| | |
|---|---|
| Format | may be one character, numeric |
| Remarks | Range, 0–5 |
| Example | See remarks |
| Domain | |
| Description | The residence of the configuration item |
| Purpose | Used in map selectors, in the "restore on" condition and to pinpoint which system has the problem |
| Format | One word |
| Remarks | This may server as the key in the enrichment process |
| Example | www2; rentcs01; RVAC |
| ObjectClass | |
| Description | The category to which the object belongs. |
| Purpose | Gives an indication of the (lowest) abstraction layer (granularity) for which the events are reported. May be used in selector in the service views |
| Format | One word |
| Remarks | This is equivalent to <application> in the PATROL alert. This may serve as a key in the enrichment process |
| Example | ROUTER; HUB; CPU; DISK; CICS-SUBSYSTEM; INTERFACE; MODEM; MQ-CHANNEL; MQ-QUEUE; PROCESS; TABLE |
| Object | |
| Description | The affected component for which the event was generated |
| Purpose | To identify the affected component |
| Format | One word |
| Remarks | Must uniquely identify the object within the domain. This is equivalent to <instance> in the PATROL event. This may serve as the key in the enrichment process |
| Example | C0t3d0s2; cpu1; filesystem; DatabaseName_TableName; MQ_QMGRNAME_MQQUEUE |
| Parameter | |
| Description | Service management metric |
| Purpose | |
| Format | One word |
| Remarks | This is equivalent to <parameter> in PATROL alert |
| Example | CpuUtil; DISKUsage |
| ParameterValue | |
| Description | The value associated with the parameter |
| Purpose | |
| Format | One word |
| Remarks | |
| Example | 93%; 456 MB |
| FreeText | |
| Description | Free form text field to further describe the condition being reported |
| Purpose | This may be used to store the original message is required |
| Format | Extracted from the original message |
| Remarks | |
| Example | 1hcbkp01 is Unreachable, Node may be Down! |

Referring to FIG. 3, listener or receiver 302a, 302b, 302c, receives messages and a normalizing process, for example, one or more CEF translators 304a, 304b, 304c, extracts the above described tokens and assigns an index to the alert.

In one embodiment, an alert is assigned an index during a monitoring request phase. For example, when a request to monitor a certain event is received, an index, monitoring rules and additional information for the event are set. The index may represent every type of alert that comes to an enterprise manager, and may be uniquely defined according to OriginClass, Origin, Domain, ObjectClass, Object, and Parameter tokens. An index number may be assigned as, for example, a next available numerical number starting at 1.

In one embodiment, the messages or extracted tokens are translated into common event format ("CEF") before the messages reach PEM, such that the messages coming from different sources are converted into a standard format. For example, each element manager 302a, 302b, 302c connected to PEM communicates the messages in its own standard format. The CEF translator 304a, 304b, 304c receives these messages and extracts the following information from the message.

| | |
|---|---|
| OriginClass | The category of the monitoring tool that is sending the message. (e.g. PATROL, AutoOperator, SiteScope etc.) |
| Origin | The domain on which the monitoring tool resides. (e.g. Apollo or cabana fro PATROL, SCmon or SOmon for SiteScope, MVSA or MVS5 for AutoOperator etc.) |
| Domain | The host that the event or alert message refers to. |
| ObjectClass | The category to which the object belongs. (e.g. Router, Hub, CPU, FileSystem, Queue etc.) |
| Object | The affected component for which the event was generated. (e.g. router_name, hub_name, cpu_number, filesystem_name, queue_name etc.) |
| Parameter | Service management metric. (e.g. CPUUtil, DiskUsage, QueueDepth etc.) |
| ParameterValue | The value of the parameter. |
| Text | The message text |

These values are stored in CEF tokens and passed on to the CEF pre-processor 306.

Thus, CEF translators 304a, 304b, 304c, receive an alert, CEF translators performs a lookup to, for example, in an alert index database table (700 FIG. 7), to assign an index to the received alert. Further actions in the event flow may then be based on this index field.

In data enrichment phase, additional information 308 may be added into the alert based on the index of the alert. The information may include a help reference number, a type of platform that the alert originated from, an on-call group for that alert, whether this alert should send out an auto page, etc. For example, in the enrichment phase, the following tokens may be assigned values for the alert: DomainClass, Action, HelpRef, ITMgtLayer, ITMgtProcess, ITMgtProcessState. The token "Action" defines the automation which is required of the alert. This includes notification, automatic corrective action, and automatic trouble ticket opening. The tokens ITMgtLayer, ITMgtProcess, ITMgtProcessState may be used for reporting functionalities.

The following are examples of the tokens and their values that may be assigned values during the enrichment phase. It should be understood that these tokens are described as examples only.

| | |
|---|---|
| CEFVersion | |
| Description | The version of Common Event Format which is followed |
| Purpose | To provide 'room for growth' or future versions |
| Format | CAPCEFV<n>R<n>M<n> |
| Remarks | V = Version, R = Release, M = Modification |
| Example | CAPCEFV010 |

-continued

| | |
|---|---|
| Origin | |
| Description | The component of process that is responsible for generating/issuing the event. In general, this is the mid level manager reporting the event |
| Purpose | To identify which mid level manager or application the event came from |
| Format | Any |
| Remarks | |
| Example | SPOA; MVS5; KM-NAME; APPLICATIONNAME |
| OriginEventClass | |
| Description | The event class as defined by the origin is applicable |
| Purpose | Event synchronization with the mid level manager. |
| Format | One word |
| Remarks | |
| Example | 11; MQ9845 |
| DomainClass | |
| Description | The class (i.e., platform type, network type) to which the domain belongs |
| Purpose | To identify the class of the domain, as well as how we can communicate back to it |
| Format | One word |
| Remarks | This may be the part of the enrichment process, or a key in the enrichment process. |
| Example | OS390; TANDEM; SOLARIS; WinNT; TCPIP |
| Action | |
| Description | Defines the kind of action to be taken for this particular alert |
| Purpose | To have a single trigger for every kind of automation |
| Format | Single character, numeric |
| Remarks | 0 = none; 1 = AutoPage; 2 = Email |
| Example | See remarks |
| ActionItem | |
| Description | Additional info in case Action > 0 |
| Purpose | To be passed as parameter to the automation script |
| Format | |
| Remarks | May be on-call group name for phone point triggers, or Email group tag for email triggers |
| Example | COMMSERV; MQONCALL |
| HelpRef | |
| Description | Action table reference number |
| Purpose | To uniquely identify the action table entry for this alert |
| Format | One word, alphanumeric |
| Remarks | |
| Example | RTD145 |
| ClarifyTicket | |
| Description | Clarify ticket number, if one has been opened on this alert |
| Purpose | To update the clarify case with changing status of the alert |
| Format | Number |
| Remarks | |
| Example | |
| ITMgmtLayer | |
| Description | The IT layer to which the alert pertains |
| Purpose | May be used as selector in service views |
| Format | One word |
| Remarks | |
| Example | NETWORK; SERVER; OS; MIDDLEWARE; DATABASE; PROCESS; APPLICATION; USERS |

-continued

| | |
|---|---|
| ITMgmtProcess | |
| Description | The main information technology ("IT") management process which is monitored |
| Purpose | To identify the IT management discipline to which the event belongs. |
| Format | One word |
| Remarks | May be one of: CONFIGURATION; AVAILABILITY; CAPACITY; SECURITY; STORAGE; SCHEDULING; OUTPOUT |
| Example | See remarks |
| ITMgmtProcessState | |
| Description | State of the ITMgmtProcess |
| Purpose | To express the desired state and to be used in the closure process of an event |
| Format | One word depending on the ITMgmtProcess (See remarks, underscored items represent the desired state) |
| Remarks | CONFIGURATION: KNOWN, UNKNOWN, CHANGED, ON, OFF, REMOVED, ERROR AVAILABILITY: AVAILABLE, UNAVAILABLE CAPACITY: NOMINAL, UNUSED, UNDERSUED, OVERUSED, EXCEEDED, FULL SECURITY: SECURE, INSECURE, VIOLATION STORAGE: OK, FAILED SCHEDULING: ENDED OK, ENDED_NOT_OK, WAITING_RESOURCES OUTPUT: PRINTED, PURGED, PAUSED |
| Example | See remarks |

In one embodiment, the tokens which are added during the enrichment phase are defined during the monitoring request phase and these values may be stored in a database 308, e.g., Sybase, indexed by the "index" token. In one embodiment, a CEF pre-processor 306 may add or associate the enrichment data to the received alert.

Thus, a CEF pre-processor 306, for example, adds the following CEF tokens as enrichment data, to the alert.

| | |
|---|---|
| DomainClass | The class or platform to which the domain belongs. (e.g. Solaris, NT, Cisco etc.) |
| Action | Whether there is an automatic action associated with the alert or not. (0 for no, 1 for yes) |
| IsInMap | Whether the event appears on the service view or not. (0 for no, 1 for yes) |
| IsRecurring | Whether the event is recurring or not. For recurring events, if the alert is already active, then a new event simply increases the count on the original alert. (0 for no, 1 for yes) |
| IsCorrelated | Whether there is a correlation rule defined for the alert or not. (0 for no, 1 for yes) (Note: Not yet implemented) |
| HelpRef | Link to Action Table. |
| ITMgtLayer | Business group affected. (e.g. RTD, E-Commerce, GT8 etc.) |
| ITMgtProcess | The process in the business group that is affected. (e.g. Database, OS etc.) |
| ITMgtProcess State | The state of the business group process. |
| Message | Event messages rewording rules. |

The alert is then forwarded to PEM 310 for distribution.

An enterprise manager, typically runs on a computer platform, receives and pulls messages from different sources and stores them in a database. PATROL Enterprise Manager ("PEM") is one example of such product running on a Solaris platform, and which stores its messages in a Sybase database. PATROL and PEM are BMC products. PATROL resides on individual hosts and monitors different parameters for exceptions, and generates alert information, which PEM may gather.

An enterprise manager such as PEM gathers alert information or messages from many different sources such as HP OpenView ITO running in Unix environment, Network Node Manager running as Network components, PATROL running in Unix/Windows environment, ESQ running in Tandem environment, AutoOperator ("AO") running in Mainframe environment, Single Point Operations ("SPO") running in UNISYS environment, and SiteScope, Topaz, Keynote, whose processing is related to Internet sites and transactions.

Referring to FIG. 3, PEM 310 receives the token having the index value and one or more added enrichment values. Upon receiving the token, PEM 310 may generate a new alert, update an existing alert or clear an old alert. PEM also may direct alerts to operator consoles and other PEM processes; display information on service effected on the operator console; run automatic operations in response to alerts; send out pager and e-mail notifications; and, open trouble tickets, for example, Clarify, for alerts.

In one embodiment, for example, in an event correlation phase, each alert is assigned a list of indices the alert may cause, or those that may cause this alert. Each alert thus may be a cause alert or an effect alert. An operator may be enabled to bring up an action table for alerts using a local automation based on the token "helpRef." The HelpRef token is a link into different tables, such as an action table that provides actions to be performed when this alert occurs. This event correlation may be performed in the CEF pre-processor.

In one aspect, an alert may be shown on a service view 314 and specify which business groups are affected. Service view 314 is, for example, an information page presented to an operator 312 and may include various information regarding alerts and hyperlinks to other information. In one aspect, Service view 314, for example, may link to a web front end to custom tables on the database that may be used to edit CEF custom tables, notification groups, blackout periods of alerts based on an index, and action items of alerts based on an index.

In one aspect CEF post-processor 316 may lookup automatic notification rules 318 associated with the alert index and perform notifications 320, for example, using PhonePoint, Clarify, E-mail. The notification may also be presented by the Service view 314.

FIG. 4 shows an example of a service view web page 400. The page shows a number of business groups 402a, 402b, 402c, 402d, 402e, 402f, 402g, 402i, 402j, in an enterprise, and which may be affected by an alert. When an alert is generated affecting a group, that group's icon or a button 404 may, for example, be highlighted or shown in a different color to show that an alert affecting that group is pending. The business groups that may be affected by various alerts may also be shown in a hierarchical directory format 406 on the Service View web page. In addition, the detailed information of the alert may be listed as shown at 408. This information may include the index number, the date and time of the alert, and a brief text describing the text.

Figure 5:
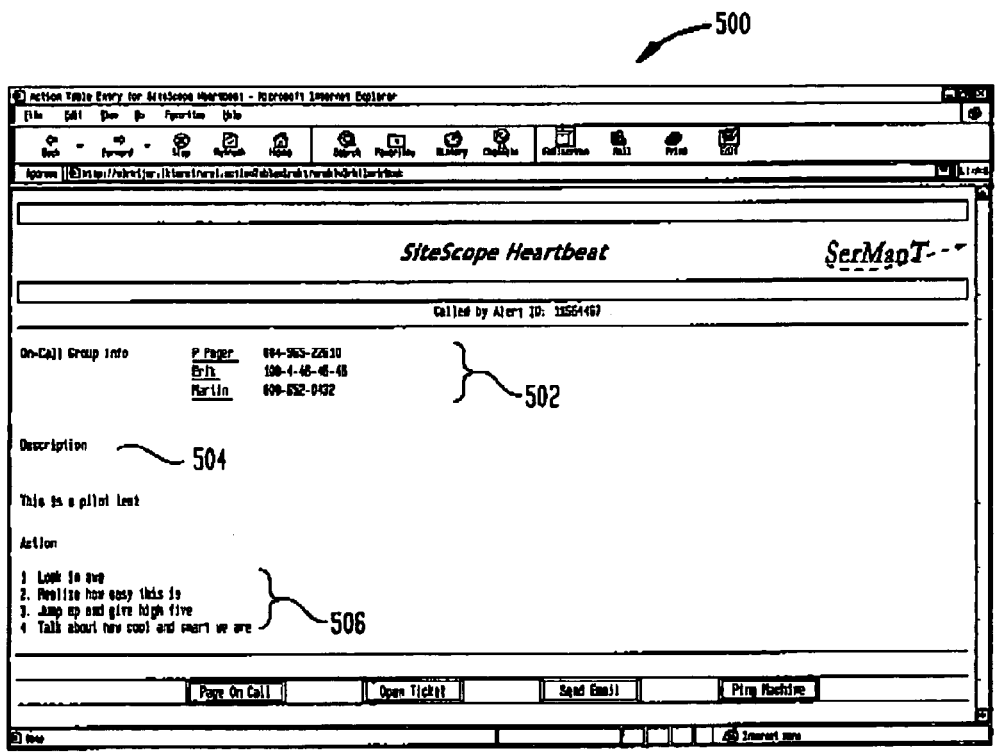
FIG. 5 shows an example of an action table.
Figure 6:
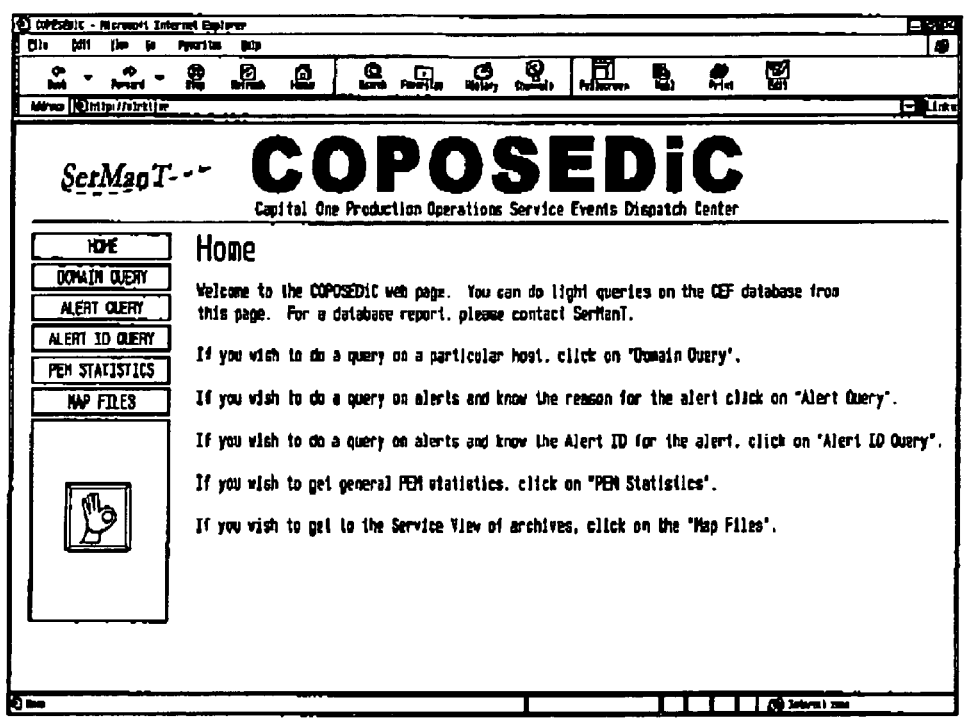
FIG. 6 shows an example of a view from which users may query the alerts received by the enterprise manager.

The service view entry may further be linked to an action table by an index of the alert, wherein clicking on the alert entry 408 opens the action table. In turn, clicking on action entries listed in the action table may automatically initiate the action. The actions may include contacting an operator or resource to handle the alert or automatically performing a problem solving process. FIG. 5 shows an example of an action table 500. Additional queries and reports may be generated, for example, by using a query web screen as shown in FIG. 6. This query screen 600 is web-based application that may be used to get a list of alerts received on the enterprise manager grouped by a IT management layer (a business group) or by domain, etc. The web-based query application also represents these alerts in form graphs and/or charts. Users, for example, may use this query screen 600 by selecting any one of the queries provided.

In one embodiment, a universal trigger executes the automation associated with the alert based on the action token. The information required for the action may be fetched from a database. For example, if it is e-mail notification, then the e-mail addresses may be fetched, if a clarify ticket needs to be opened, the severity and the queue may be fetched. In addition, reports may be generated automatically on a timely basis, for example, daily or weekly, via time initiated triggers in a desired format and may be sent to appropriate support group.

As described with reference to FIG. 4, Service View is a Windows based application which classifies the alerts into different business groups. Based on whether the IsInMap token is true or false, the alerts may be made to appear on the service view under a particular business group icon. IsInMap is a Boolean token, for example, to indicate whether to display the alert using the service view. When an alert pertaining to a particular group becomes active, the icon for that group changes color and the alert shows up on the bottom part of the screen. The operator at a management or control center may then acknowledge the alert and take appropriate or necessary actions.

As described with reference to FIG. 5, an action table 500 may comprise a database such as Lotus Notes/Domino that contains information on actionable alerts coming to the enterprise manager such as PEM. Each alert on the enterprise manager may have a link to the action table entry via a token, for example, "HelpRef" token. The token may be used to present this action table, for example, on a web browser, for example, from the service view display by clicking on a button or an entry. In one embodiment, more than one alert may be associated with an entry in the action table. Each action table entry includes a general description of the alert 504, the on-call group information 502, and the action steps 506 that an operator needs to take on receiving the alert. Based on the action table entry, an operator may initiate a page, and open or update trouble tickets for the alert from the web browser.

PhonePoint is an NT based application used by PEM to send out pager and phone notifications for alerts received on PEM. This paging notification may either be initiated manually by an operator through the service view or automatically as soon as the alert becomes active on PEM. The on-call person may need to call back into the Phone Point voice response unit to accept the alert. If the on-call person does not call back within a specific time, the notification may be automatically escalated to the next person in the group.

Star is an HTML front-end for an event dispatch system and is used to perform real-time pre-defined queries on the PEM alerts database. Queries may be performed on a particular alert, set of alerts, e.g., as defined by alert index, or a particular domain. A screen page may be displayed showing various statistics on the alerts received with hyperlinks to detailed information on the alert.

FIG. 7 illustrates an alert index table. In one embodiment, alert indices may be setup as set forth below. Alerts coming to an enterprise manager such as PEM are defined in the alert index table 700, e.g., CEFAlertIndexTable, in order to be recognized as a valid alert. Alerts whose index is not defined in the index table may not be forwarded to the enterprise manager, PEM by the common event format ("CEF") processes. Each monitoring tool such as processes residing on different platforms or systems that monitors events and alerts on respective systems may send alert messages. The messages may include information to be extracted into a set of tokens along with alert messages. These token information may include the following.

| | |
|---|---|
| OriginClass | The category of the monitoring tool that is sending the message. (e.g. PATROL, AutoOperator, SiteScope etc.) |
| Origin | The domain on which the monitoring tool resides. (e.g. Apollo or cabana fro PATROL, SCmon or SOmon for SiteScope, MVSA or MVS5 for AutoOperator etc.) |
| Domain | The host that the event or alert message refers to. |
| ObjectClass | The category to which the object belongs. (e.g. Router, Hub, CPU, FileSystem, Queue etc.) |
| Object | The affected component for which the event was generated. (e.g. router_name, hub_name, cpu_number, filesystem_name, queue_name etc.) |
| Parameter | Service management metric. (e.g. CPUUtil, DiskUsage, QueueDepth etc.) |
| ParameterValue | The value of the parameter. |
| Text | The message text |

Upon receiving an alert from the monitoring tool, the CEF translator extracts these tokens from the full message and performs a lookup to see whether the alert is defined in the index table 700, e.g., CEFAlertIndexTable. The definition in the CEFAlertIndexTable is, for example, based on these tokens, e.g., Origin, Domain, ObjectClass, Object, and Parameter. Each token may have a wildcard, allowing match of any data. When an index is found for the alert in the index table, for example, by matching a rule in the look up table, the alert index for that definition may be added to the alert. The rule for matching an index, for example, may specify an exact match on some of the tokens and wildcard matches on others. Another rule may specify, exact matches on all the tokens. This alert index determined then is used for any further actions associated with this alert. Accordingly, in one aspect, the first step in setting up a new alert is to make sure that there is an alert index present in the definitions table for the five tokens.

If an index definition for the requested event is not found in the alert index table 700, a new definition needs to be added. A new definition would be a new entry in the alert index table 700 and, for example, would include the combination of token values for the requested event assigned to a next available index number.

Once the alert index is known, the enrichment tokens for the alert may be defined. These tokens are:

| | |
|---|---|
| DomainClass | The class or platform to which the domain belongs. (e.g. Solaris, NT, Cisco etc.) |
| Action | Whether there is an automatic action associated with the alert or not. (0 for no, 1 for yes) |
| IsInMap | Whether the event appears on the service view or not. (0 for no, 1 for yes) |

| | |
|---|---|
| IsRecurring | Whether the event is recurring or not. For recurring events, if the alert is already active, then a new event simply increases the count on the original alert. (0 for no, 1 for yes) |
| IsCorrelated | Whether there is a correlation rule defined for the alert or not. (0 for no, 1 for yes) (Note: Not yet implemented) |
| HelpRef | Link to Action Table. |
| ITMgtLayer | Business group affected. (e.g. RTD, E-Commerce, GT8 etc.) |
| ITMgtProcess | The process in the business group that is affected. (e.g. Database, OS etc.) |
| ITMgtProcess State | The state of the business group process. |
| Message | Event messages rewording rules. |

If the new alert uses an action table entry that is already defined in the action table, the "HelpRef" for the action table is linked with the new alert. If the new alert has a new action table entry, the following information is provided to create a new action table entry.

| | |
|---|---|
| Title | Title of the action table entry |
| OnCall group | OnCall group name as it appears in Athena |
| Description | Description of the alert(s) linked to this action table |
| Action | Action steps that the operator needs to take on receiving this alert |
| Buttons | The list of buttons that need to be active on the action table page. (Page Oncall, Open Ticket, Send Email and Ping Machine) |

Based on the alert index, the alerts may be suppressed on an enterprise manager, for example, PEM, during a particular time frame. During a blackout period, the alerts specified are not processed by the enterprise manager. The following information may be provided to suppress the alert.

| | |
|---|---|
| AlertIndex | The AlertIndex of the alert |
| Suppression Type | Daily or weekly |
| DeactivateDay | If it's a weekly schedule, then the day of the week when the alert needs to be deactivated. |
| DeactivateTime | Time of the day when the alert needs to be deactivated |
| ActivateDay | If it's a weekly schedule, then the day of the week when the alert needs to be activated. |
| ActivateTime | Time of the day when the alert needs to be activated |

For alerts coming into the enterprise manager such as the PEM, the CEF post-processor may send out automatic notifications based on defined rules or an operator may initiate notifications based on the notification rules defined on PEM. To define notification rules, the following may be provided as applicable.

| | |
|---|---|
| AlertIndex | The AlertIndex of the alert |
| Severity | The alert severity for which the notifications need to be sent. (One of critical, major, minor, warning, informational and clear) |

-continued

| | |
|---|---|
| Auto | 1 if this is an automated action or 0 if this is a user-initiated action |
| Delay | Time in seconds for which the alert needs to be active before the notification is sent out |
| GroupName | Group name of the on call group as is appears on Athena |
| FYI GroupName | Group Name as it appears on Athena for the FYI page |
| Email Address | If applicable, the internet email id(s) for E-Mail notification |
| Queue Name | If applicable, then the Clarify queue to which the ticket should be dispatched |
| Call Type | If applicable, the call type of the Clarify ticket |
| Clarify Severity | If applicable, the severity of the Clarify ticket |

Notifications may include phone calls, paging, e-mails, or any other notifications methods to a system or a person responsible for handling the alerts. More than one notification rules may be defined for an alert index, resulting in multiple notifications.

In embodiment, on-call groups may define and maintain their own call group information on an application such as Athena, and automatically propagate that information to a paging application such as PhonePoint. Athena is a web-based application that list information such as contact information for operators or employees of a company.

PhonePoint, for example, receives on-call group information from, for example, Athena. As soon as a person or a group is added, updated or deleted on Athena, the information is replicated on PhonePoint. The information on Athena is stored in a format different than PhonePoint.

Athena documents may be mapped to PhonePoint documents as follows. Athena has two types of contact resources, person and resource. A Person is an associate who has fixed contact information. A resource is a contact that keeps passing from one associate to another, for example, primary on-call pager or cell phone. The definition of both these documents may be same on PhonePoint.

Figure 8:
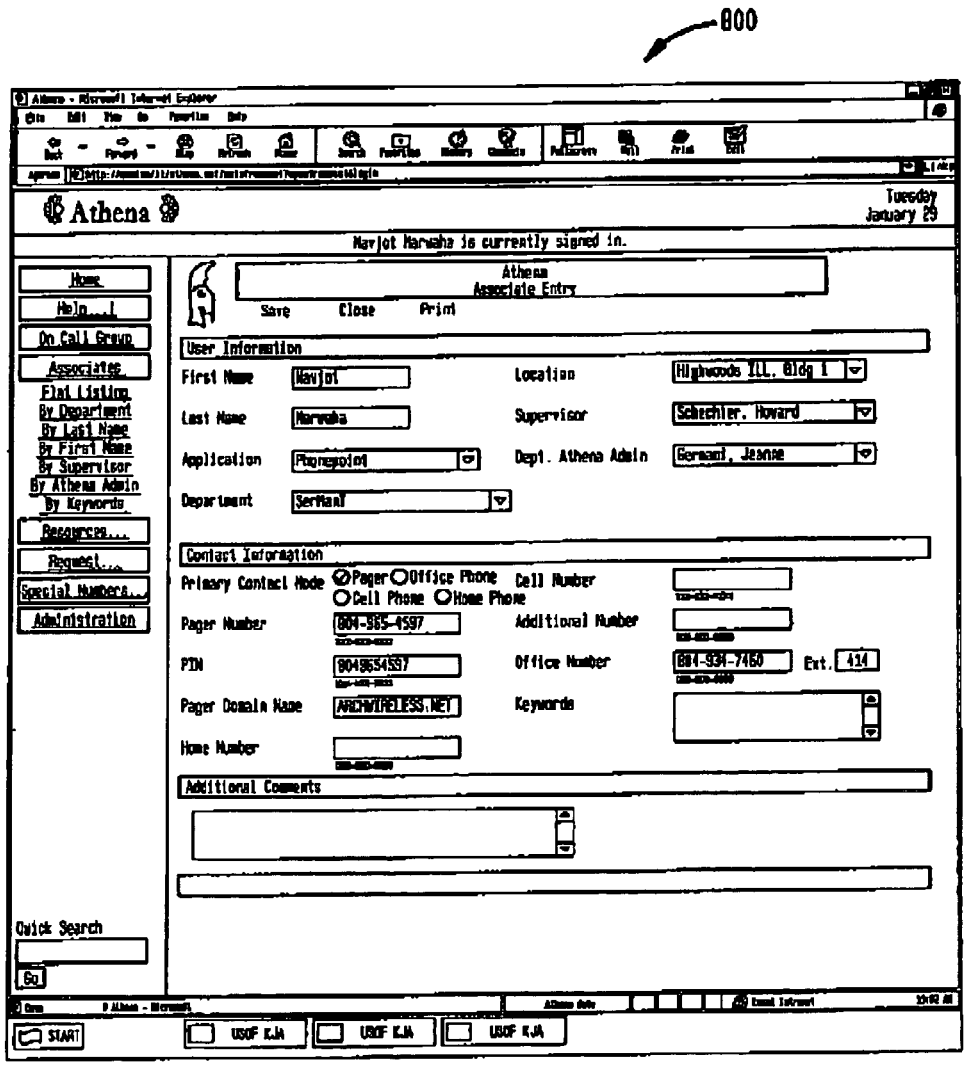

In one embodiment, when defining a person on Athena, up to four contact numbers may be defined. These are pager number, office phone, cell phone number and home phone. For each person or resource, one of these may be defined on PhonePoint as the primary contact method. This is defined by the "Primary Contact Mode" radio button on the "Edit document" screen. The screen shot 800 of this Athena page is shown in FIG. 8.

Figure 9:
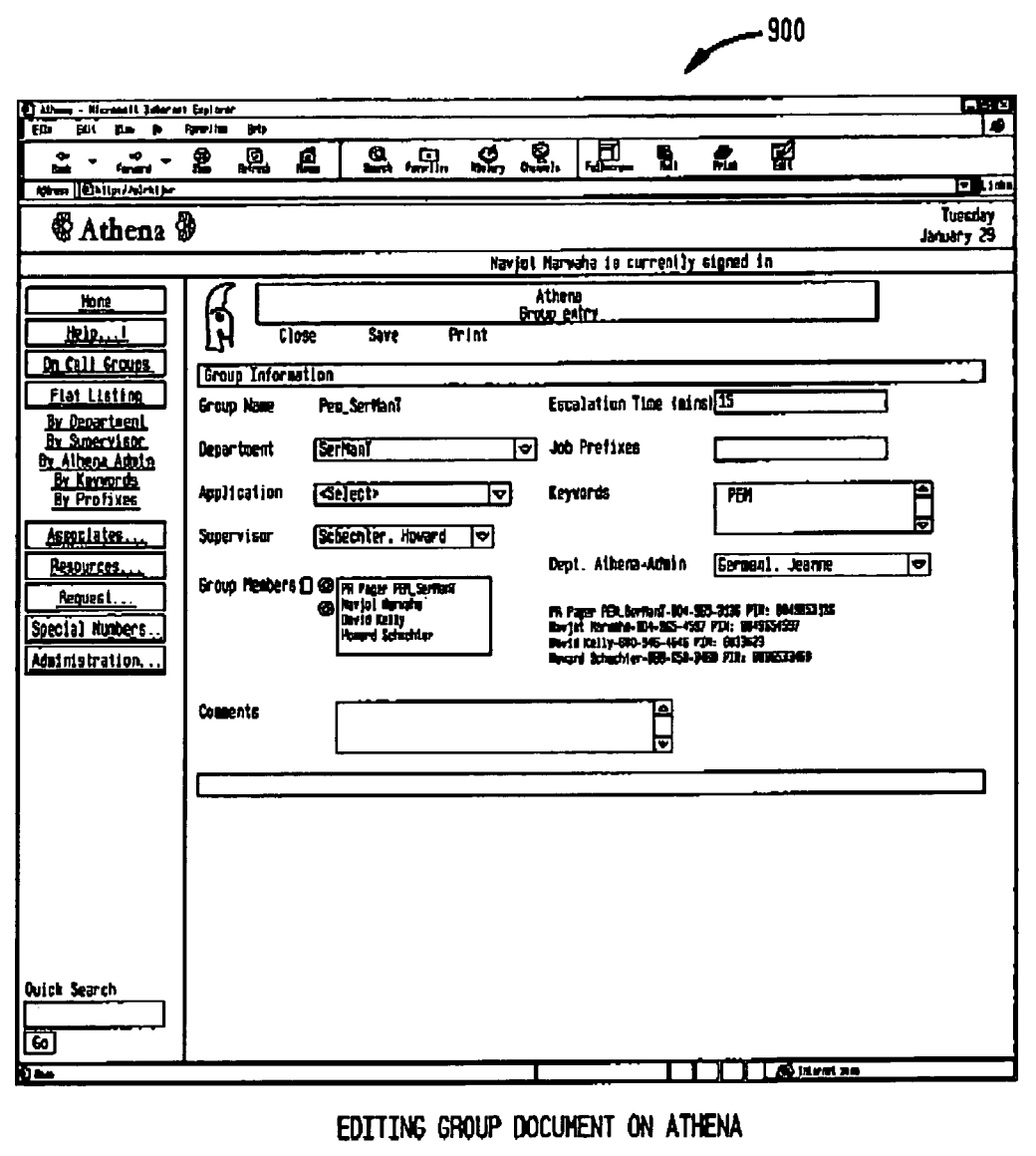

These persons and resources may be added to an on-call group roster. This is done by either defining a new group or editing an existing group. The "Escalation time" defines the time period in minutes before the page or call is escalated to the next person in the roster. FIG. 9 shows a screen shot 900 of Athena for defining new persons. For the example shown in the following page, the escalation time has been set to 15 minutes. The primary on-call is the resource "PRPager PEM-SerManT", the secondary on-call is "Navjot Marwaha," so on and so forth. If the primary on-call does not call back into PhonePoint within 15 minutes of the notification, the call is escalated and the secondary on-call is notified of the alert.

When a new alert is set up, an on-call group responsible for handling the alert may expect to be notified when the alert becomes active. As explained above, the notification is typically based on the rules set up with the new alert. This immediate notification ensures that problems are detected and fixed with a minimum downtime. Also, daily reports run on all actionable alerts aid in a long-term study on these alerts to help identify root cause of the various problems and correlations between different configuration items.

When an alert becomes active, it appears on the service view. At this time, two processes may occur simultaneously, automated and user-initiated. In case of automated notifications, the CEF post-processor sends a request to an application equipped to handle sending out pages, for example, PhonePoint. At the same time, the alert appears on the service view. The operator may acknowledge the alert, which updates the "Acknowledge" field of the alert with the current time. The operator then may bring up the action table for the alert and carry out the actions as described in the action table. These actions may include verifying the auto-notification, initiating a notification or additional house keeping before sending out notifications.

In one embodiment, each alert may include a set of tokens in addition to the alert text, which store additional information for the alert. These tokens are described below.

| | |
|---|---|
| Alert ID | The alert number on PEM |
| Text | The alert text as it will appear on the service view and pager notifications. |
| Severity | The alert severity as classified by the source of the alert |
| TimeReceived | Time the alert was received on PEM |
| Acknowledged | Time alert was acknowledged by IM operator |
| Assigned | Time PhonePoint sent out notification to the support group |
| Accepted | Time the alert was accepted by the on call group |
| Closed | Time the alert was closed on PEM |
| cefAction | <IsInMap>: :<Action>: :<HelpRef> |
| cefAlertIndex | The Alert Index of the alert |
| cefDomain | <DomainClass>: :<Domain> |
| cefITMgt | <ITMgtLayer>: :<ITMgtProcess>: :<ITMgtProcesstate> |
| cefObject | <ObjectClass>: :<Object> |
| cefOrigin | Tokens specific to the source of the alert |
| cefParameter | <Parameter> |
| cefParameterValue | <ParameterValue> |
| Comments | Text field which can be used to add user comments to the alert. It is also used by automation to log the progress of automation. |

PhonePoint notifications notify an operator by, for example, sending a page. The page received by an on-call person, for example, may have the following format:

PEM #<alert_number> (<severity>)> <alert_text>: Call 270–1540: <date_

Or, for an informational page:

PEM FYI#<alert_number> (<severity>) > <alert_text>: <date_time>

The maximum length of the page may be defined, for example, as 200 characters and depending on the length of <alert_text>, may be truncated. On initiating the alert, PhonePoint updates the "Assign" field of the alert with the current time.

On receiving this alert, the on-call person's first action may be to call back into PhonePoint, for example as specified on the page, to accept or reject the page. If the primary on-call does not respond to PhonePoint, then the notification is escalated to the next person/resource in the group definition.

On dialing into PhonePoint, the on-call person is prompted to enter a user ID and a password. Once the user logs in, PhonePoint goes through the alert numbers that are assigned to the user. For each of these alerts, the on-call person is given an option to accept or reject the alert.

| | |
|---|---|
| Accept | Support person acknowledges the alert and is working on the incident. Support person provides an update to Operator within 30 minutes of accepting the page. |
| Reject | Support person rejects the alert and is not working on the incident. Support person immediately notifies Operator providing an explanation for rejecting the alert. REJECTED alerts causes an automatic escalation of paging based on the defined escalation criteria of the support group. |

When an alert is accepted, PhonePoint updates the Accepted field of the alert with the current time. The actions taken by PhonePoint may be also added to the comments field of the alert.

E-mails may be sent out automatically or initiated manually from the service view on receiving an alert. The e-mail is sent from a designated domain address with a designated subject, for example, "Event Alert." The body of the e-mail message may include:
Alert Number: 11601279
Alert Index: 0200100000
Alert Text: SOmon: Link is inactive
Time Received: Feb. 14 2002 9:42:58:866AM
CEF Tokens:
CEF Action: 0::1::SiteScope
CEF Domain: N/A::N/A
CEF Object: SiteScope Mail Link::SOmon
CEF Parameter: HeartBeat
CEF ParameterValue: Inactive
CEF Origin: SOmon
CEF IT Management Layer: N/A::N/A::N/A
This is an automatic notification from PEM. Please do not reply to this E-Mail.
Please contact SerManT Integration Team if you do not wish to receive this E-Mail.

The alerts on PEM may be used to open trouble tickets, for example, Clarify trouble tickets, manually or through automation. These tickets may be opened with the title:
PEM #<alert_number> (<PEM_host>): <First 50 characters of the alert text>
Trouble tickets typically address one or more problems.

The full alert text may be added to the case description along with the time that the alert was received. The case may be further updated with everything that is added to the alert comments on PEM automatically.

In one embodiment, an operator may run daily, weekly, and monthly reports on PEM alerts received during that period along with statistics about the average times taken to resolve the issue. Study of these reports over a period of time may help the support group to find root-cause problems and refine the alert thresholds.

Quick pre-formatted reports may also be performed on "Star," the HTML front end to the event handler. Information may be gathered about a particular alert, an alert index or a particular domain or host. The report provides information about the occurrence of alerts in the past, for example, 10 days, the distribution by severity, average times taken to respond to the alert and resolve the issue and the list of alerts.

As described above, alert tokens are sent by various monitoring tools, e.g., via following token values: AlertText; OriginClass; Origin; Domain; ObjectClass; Object; Parameter; Parameter Value. In addition, alert enrichment information may be sent by various monitoring tools, e.g., via following token values: DomainClass; Action; IsInMap; IsRecurring; ITMgtLayer; ITMgtProcess; ITMgrProcessState. ITMgrProcessState, for example, may have values such as critical, major, minor, warning, informational, and clear, to indicate the condition of the alert. Further, the monitoring tool may send reworded alert messages, the alert index if known, and a link to an action table, or "helpRef."

Action table definitions may be sent by a monitoring requester, for example, by sending information relating to action table title; on-call group name; action table description; action steps; whether to activate paging, e-mail notification, open ticket, ping machine; and "HelpRef."

Notification rules may be defined by using the following information sent by various monitoring tools. Alert information used in defining notification rules may include alert index, severity, delay in unit of time, and whether to automate. Paging information used in defining notification rules may include names of one or more groups to be paged. E-mail information includes e-mail address, and trouble ticket information includes queue name, call type, and severity. Blackout schedule information may include schedule type, i.e., whether to schedule the blackout weekly, daily, etc. Blackout schedule information additionally may include alert index, deactivate day, deactivate time, activate day, and activate time. Alert index refers to the alert being blacked out, the deactivate day and time refers to the time to begin the blackout and the activate day and time refers to the time to resume the notifications for the alert.

Figure 10:
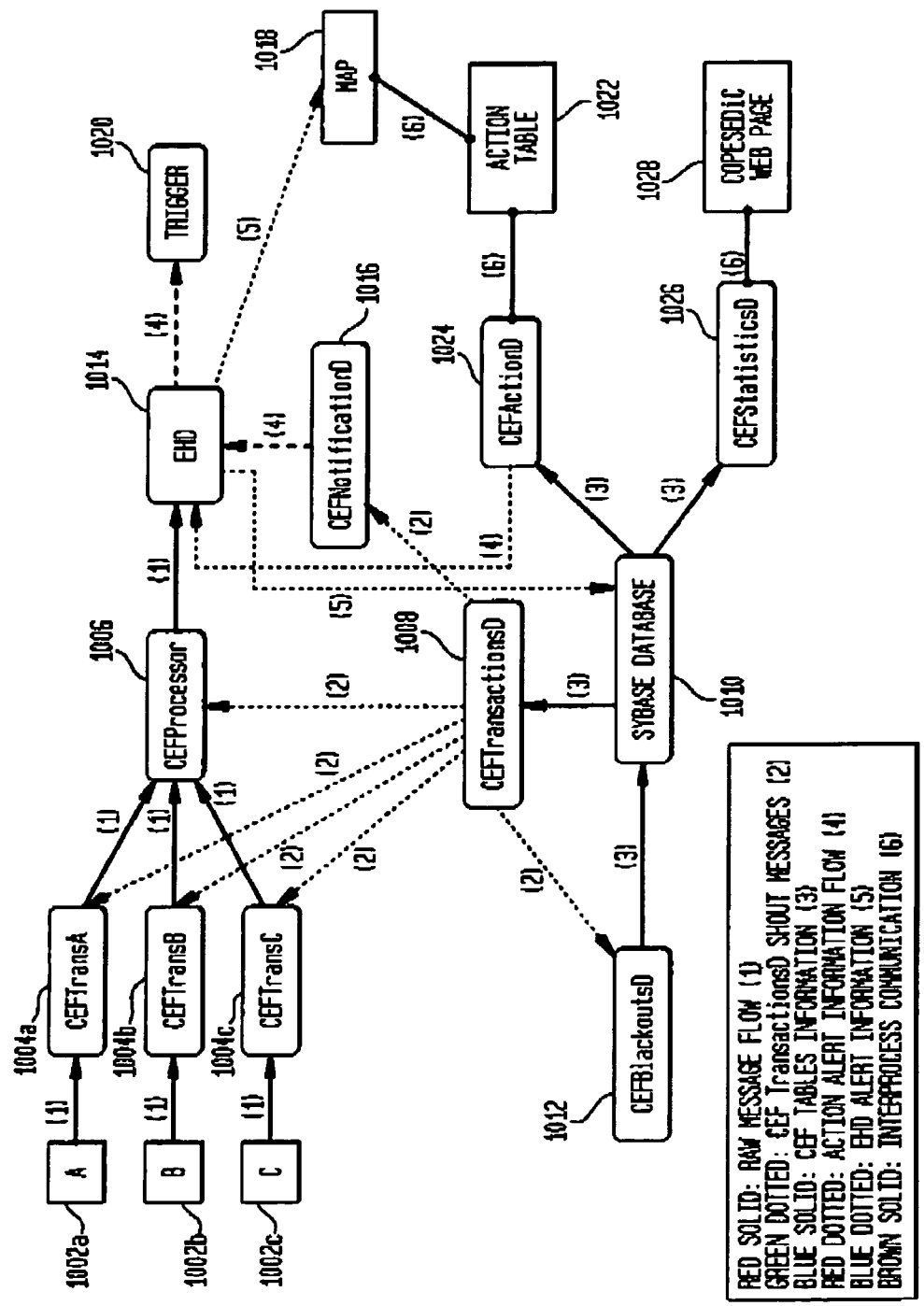
FIG. 10 is a diagram illustrating interaction and processing among different components in one embodiment.

FIG. 10 is a diagram illustrating interaction and processing among the components in the present system in one embodiment. A 1002*a*, B 1002*b*, C 1002*c* monitoring tools send alert messages in their own standard format. These monitoring tools are, for example, application programs or daemon processes running on different systems or platforms. One or more translator component, CEFTransA 1004*a*, CEFTransB 1004*b*, CEFTransC 1004*c*, for example, translate these alert messages into a standard or common event format ("CEF") using tokens. Descriptions for these tokens were provided above.

CEFTransA 1004*a*, CEFTransB 1004*b*, CEFTransC 1004*c*, also perform searches on the index table to determine if an index exists for this alert. A match, for example, is performed on the token values and predefined rules. If found, an index for the alert is retrieved, and subsequent processing on this alert is performed using this index. Although shown as three separate translators for each sources, one translator that translates messages from all sources may be used.

CEFProcessor 1006 uses the alert index to determine enrichment rules or data associated with the index. The enrichment rules or data provide information on the business group affected by the alert, the machine and domain class originating the alert, links to an action table, this alert and any related alerts to be shown in Service View, and whether this alert is automatic or recursive.

CEFTransactionsD 1008 is a daemon process that monitors the database 1010 and notifies the other processes of change in the database tables. The database, for example, may be a Sybase Database. The tables monitored may include, for example, the alert index table and enrichment data table.

CEFBlackoutsD 1012 is a daemon process that monitors incoming blackout data, and activates or deactivates the alert for the requested duration. Activation and deactivation, for example, may be performed by changing a boolean value of a blackout flag in the alert index table or any other table.

EHD 1014 is an event handler daemon that may be a part of an enterprise manager, for example, the PEM. EHD 1014 receives tokenized alerts from the CEFProcessor 1006 and sends the alerts to CEFNotificationD 1016 or a Map process 1018. CEFNotificationD 1016 receives automatic alerts from the EHD 1014 and activates a Trigger 1020 for automatic notifications such as e-mail or paging. Map 1018 is a view presented to an operator, for example, listing the alerts and affected business group. FIG. 4 is a Service View screen shot that shows an example of a map. From the map 1018, an operator may activate an action by, for example, clicking on the alert.

An ActionTable 1022 may be opened when an operator clicks on the alert from the map 1018. The operator then may further activate the actions specified in the ActionTable 1022, for example, by clicking on appropriate buttons or entries. CEFActionD 1024 is a daemon process that receives the signal to act when an operator clicks on an action specified in the ActionTable 1022. CEFActionD 1024 then notifies EHD 1014, which activates a Trigger 1020 for notifications such as e-mail or paging. Using an alert index for accessing into these tables and daemon process simplifies the alert processing coordination among disparate systems, platforms, and business groups.

CEFStatisticsD 1026 is a daemon process that monitors the database 1010 and provides various statistics and history on alert data. These statistical data may be shown via a web browser 1028.

As described above, generally the action table for an alert may be made available to the operator on the click of a button. Each alert may carry a help reference number which may be used to link it to an action table entry in a database. The action table may be HTML based, and may include hyperlinks to related documents for further investigation.

Further, as described above, an incoming alert event may be made to automate the opening of a trouble ticket, for example, initiated through a user-initiated automation. It may be further made to track/update the trouble ticket with information such has who was paged on the issue, when they were paged and when the alert was cleared on the enterprise manager.

CEF may considerably reduce the maintenance required on the enterprise manager. Updating maps or service views would not be so cumbersome. With simplified SQL selector statements, an event handler daemon ("EHD") may run much more smoothly. Triggers include a paging application such as PhonePoint that may further be consolidated into a single trigger, with the on-call group information stored in the alert itself.

Figure 11:
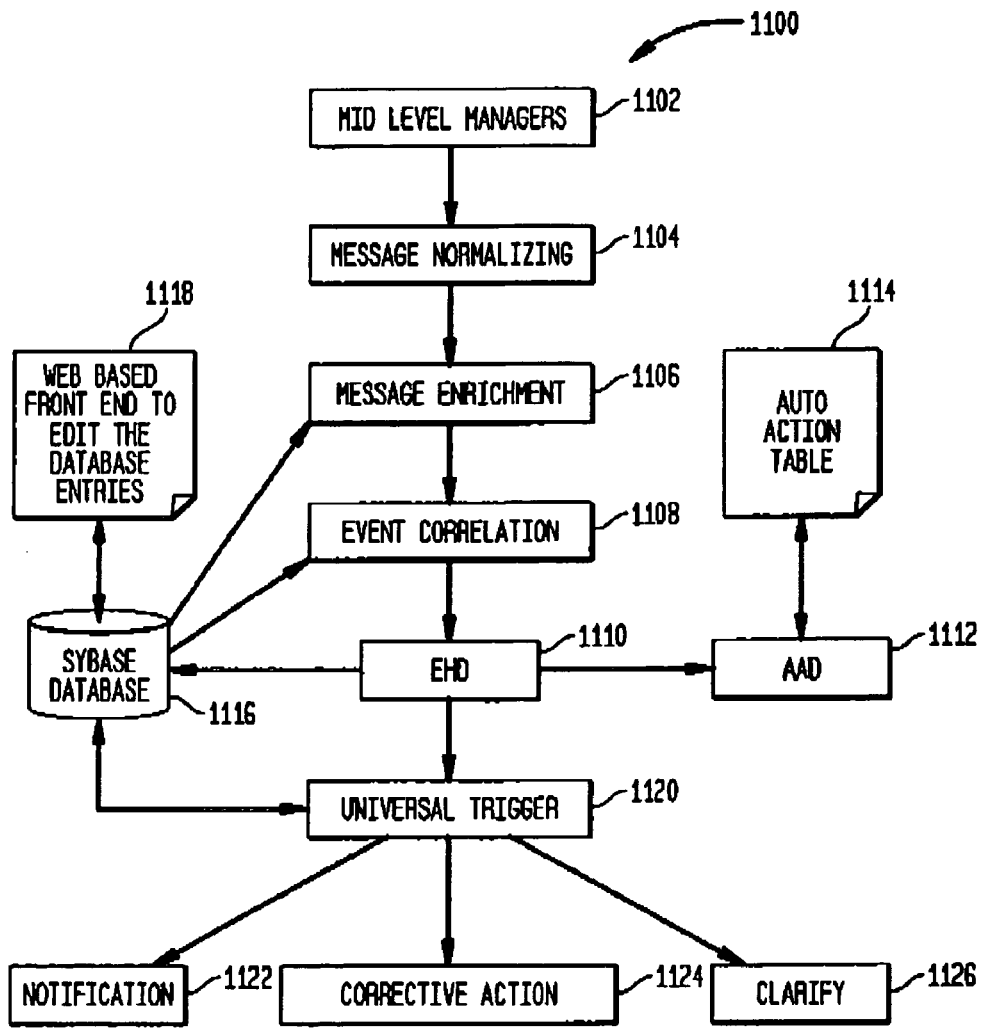
FIG. 11 is a flow diagram illustrating the common event format processing in one embodiment.

FIG. 11 is a flow diagram 1100 illustrating the common event format processing in one embodiment. At 1100, mid level managers such as the monitoring tools residing in various platforms send alert messages. At 1102, the message is normalized, for example, by extracting necessary information from the message and formatted into a standard format or a token. An index is also assigned to the standardized token. At 1106, additional information is added to the standardized token. At 1108, during event correlation, each alert is assigned a list of indices the alert may cause, or those that may cause this alert. At 1110, EHD receives tokenized alerts, and updates database 116 appropriately. At 1112, Active Alert Display ("AAD") displays, for example, on an operator display terminal, the active alerts in the EHD.

At 1114, action table may be accessed by the AAD in a similar manner that a service view application accesses and uses the table.

At 1118, a web front end to the custom tables on the database may be provided to allow operators to edit CEF custom tables, notification groups, blackout periods of alerts based on an index, and action items of alerts based on an index. At 1120, a universal trigger is activated to initiate automatic notifications such as e-mail 1122, corrective actions 1124, or paging 1126.

The system and method disclosed may be implemented and run on a general purpose computer. The Internet and the World Wide Web have been used as an example of a communication medium, for example, for presenting alert information to operators. The communication network and presentation medium, however, is not limited only to the Internet or a web browser. The system and method disclosed may be utilized in connection with LAN, WAN, wireless, and any other communication medium and network.

The embodiments described above are illustrative examples of the present invention and it should not be construed that the present invention is limited to these particular embodiments. Various changes and modifications may be effected by one skilled in the art without departing from the spirit or scope of the invention as defined in the appended claims. Accordingly, the present invention is not limited except as by the appended claims.

I claim:

1. A method for defining an alert index, comprising:
receiving a request to monitor an alert;
receiving information associated with the alert from one of a plurality of different sources, the different sources having differently formatted information;
converting the differently formatted information into standardized tokens to classify the alert into a type of alert that is associated with a set of standardized tokens;
assigning a unique index value to the type of alert;
associating the set of standardized tokens with the unique index value; and
using the unique index value to act on the alert from the plurality of different sources.

2. The method of claim 1, further including:
storing the index value and the standardized tokens.

3. The method of claim 1, further including:
determining whether an alert index associated with the standardized tokens exist; and
if the alert index exists, assigning the existing alert index value to the alert.

4. The method of claim 3, wherein if the alert index exists, the receiving information associated with the alert includes using information associated with the existing alert index value.

5. The method of claim 1, further including defining one or more enrichment tokens to be associated with the alert.

6. The method of claim 1, further including defining an action table entry to be associated with the alert.

7. The method of claim 6, wherein the defining an action table entry includes:
determining whether the alert is to be associated with an existing action table entry; and
if the alert is to be associated with an existing action table entry, linking the alert to the existing action table entry.

8. The method of claim 6, wherein the action table entry includes description of one or more steps for reacting to the alert.

9. The method of claim 8, wherein the action table entry is presented to an operator as an HTML document.

10. The method of claim 1, further including:
defining a blackout schedule, wherein an alert is suppressed for a predetermined time period.

11. The method of claim 1, further including:
defining one or more notification rules associated with the alert.

12. The method of claim 11, wherein the defining one or more notification rules includes defining any one or more of alert index, severity, whether to perform an action automatically or manually, time delay before a notification is performed, group name to notify, email address, and trouble ticket queue name.

13. The method of claim 1, wherein the standardized tokens include any one or more of origin, domain, object class, object, and parameter.

14. A method for defining an alert index, comprising:
receiving a request to monitor an alert;
receiving information associated with the alert from a plurality of different sources, the different sources having differently formatted information;
converting the differently formatted information into standardized tokens to classify the alert into a type of alert that is associated with a set of standardized tokens;
assigning a unique index value to the alert;
associating the standardized tokens with the unique index value;
determining whether the alert is to be associated with an existing action table entry;
linking the alert to the existing action table entry, if the alert is to be associated with an existing action table entry; and
if the alert is to be associated with a new action table entry, receiving new action table entry information and creating a new action table entry.

15. The method of claim 8, wherein the receiving new action table entry information includes receiving any one or more of a title of the new action table entry, a group name to notify, description of the alert linked to the new action table entry, one or more action steps to perform, and a list of links to activate.

16. A system for defining an alert index, comprising:
a processor responsive to receiving a monitoring request for an alert, operable to tokenized a message from one of a plurality of different sources, the different sources having differently formatted information converting the differently formatted information into standardized tokens, and assigning an alert index value to the alert;
the processor further operable to associate additional information with the standardized alert tokens and
the processor further operable to allow a user to edit database entries having information associated with the alert via a web front end,
wherein upon receiving a request to monitor an alert, the alert is indexed and further actions are based on an alert index of the alert.

17. A program storage device readable by machine, tangibly embodying a program of instructions executable by the machine to perform method steps of defining an alert index, comprising:
receiving a request to monitor an alert;
receiving information associated with the alert from one of a plurality of different sources, the different sources having differently formatted information;
converting the differently formatted information into standardized tokens to classify the alert into a type of alert that is associated with a set of standardized tokens;
assigning a unique index value to the type of alert;
associating the set of standardized tokens with the unique index value; and
using the unique index value to act on the alert from the plurality of different sources.

18. The program storage device of claim 17, further including:
using the unique index value for one or more further actions associated with the alert.

* * * * *